United States Patent Office 3,530,464
Patented Sept. 22, 1970

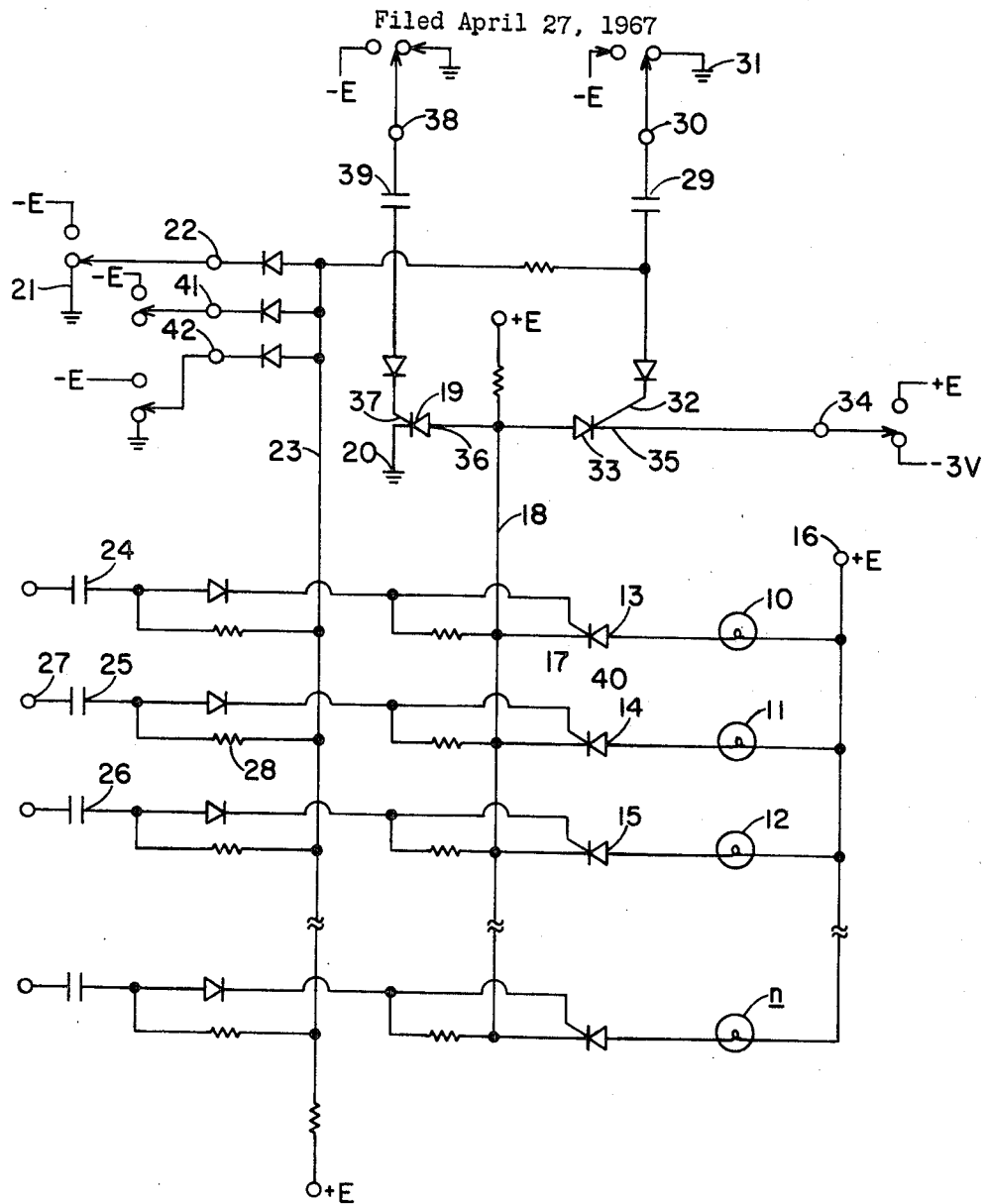

3,530,464
CENTRAL DISPLAY SYSTEM CONTROL CIRCUIT
Robert E. Young, Houston, Tex., assignor, by mesne assignments, to Dresser Systems, Inc., Houston, Tex., a corporation of Delaware
Filed Apr. 27, 1967, Ser. No. 634,327
Int. Cl. G08b *19/00;* H05b *37/00*
U.S. Cl. 340—412                    10 Claims

ABSTRACT OF THE DISCLOSURE

A single "holding" silicon controlled rectifier is connected in series with a common conduction path for a plurality of lamps. Each lamp, in turn, has a silicon controlled rectifier connected in series with it in addition to the common, holding silicon controlled rectifier. The holding silicon controlled rectifier has a control electrode connected to receive a SET pulse to render the holding silicon controlled rectifier conductive, thereby providing continuity in the common conduction path for these lamps whose series-connected silicon controlled rectifiers have been turned on, selectively.

To select a different combination of lamps to be turned on, a single "clearing" silicon controlled rectifier is rendered conductive to interrupt the conductivity of the holding silicon controlled rectifier, thereby turning off all of the lamps. The conductivity of the holding silicon controlled rectifier is restored by the SET pulse, but only those lamps whose series-connected silicon controlled rectifiers have been selected will be illuminated thereafter.

BACKGROUND OF THE INVENTION

The present invention, generally, relates to remote central display systems and, more particularly, to a control circuit for such display systems.

Heretofore, the control circuits for display systems indicating the condition of a plurality of remotely positioned situations have been complicated, costly and expensive to maintain. Although many control circuits have been proposed in the past to provide more economical, yet reliable, control of a central display system, it is acknowledged generally that further improvement is needed.

It is a principal object of the present invention to provide a new and improved control circuit for a central display system that admits of greater economy and simplicity than has been available in the past.

Another object of the present invention is to provide a new and improved control circuit for a central display system using silicon controlled rectifier components for controlling the conductivity of remote indicating elements.

SUMMARY OF THE INVENTION

Briefly, the conduction control circuit of the present invention involves a central display system such as used for indicating a predetermined condition of a plurality of remote situations. A plurality of silicon controlled rectifiers are connected, one in series with each of a plurality of indicating means, and a holding silicon controlled rectifier is connected to all of the indicating means for completing an electrical path for energizing the indicating means. A suitable means is connected to interrupt the conductivity of the holding silicon controlled rectifier for de-energizing the indicating means and also for interrupting the conductivity of the plurality of series-connected silicon controlled rectifiers. Then, a separate means is connected to re-establish the conductivity of the holding silicon controlled rectifiers, thereafter permitting a trigger circuit connected with the plurality of silicon controlled rectifiers to energize selected ones of the indicating means.

BRIEF DESCRIPTION OF THE DRAWINGS

The above and other objects and advantages of the present invention will become more apparent from the following detailed description of a presently preferred embodiment, when taken in conjunction with the single figure of the drawings, wherein is shown a circuit diagram of a conduction control circuit for a central display system.

DESCRIPTION OF THE PREFERRED EMBODIMENT

A plurality of lamps 10, 11, 12 and $n$ are examples of suitable indicating elements for such purposes as indicating the status of a remote situation. For example, when the lamp 10 is lit, it may indicate that a remote pump (not illustrated) is operating, and when the lamp 11 is lit, it may indicate that such pump is not operating. The respective lamps 10, 11, etc., are conductive depending upon the conductive state of respective silicon controlled rectifiers 13, 14, 15, etc. The conductive path, therefore, for each lamp would be from a positive terminal 16 through, for example, the lamp 10, through the silicon controlled rectifier 13, through a connection 17, through a bus 18, through a "holding" silicon controlled rectifier 19 and finally to a ground 20.

Hereinafter, a silicon controlled rectifier will be referred to as an SCR.

It may be seen now that the energization of the respective lamps is dependent upon the conductivity of each respective SCR 13, 14, 15, etc., as well as the holding SCR 19 which is common to all of the series-connected SCR's 13, 14 and 15. If the remote situation changes, such as the pump becoming inoperative, it will be necessary for the control circuit of the invention to extinguish or de-energize the lamp 10 and connect in, or energize, the lamp 11. This is called "updating" the central display system panel, and this is accomplished by first disconnecting the terminal 22 from the negative bias and connecting it to a ground connection 21 so that a bus 23 is at ground potential. This permits each of a plurality of capacitors 24, 25, 26, etc., to be charged, selectively, in accordance with information concerning the remote situation. For example, in the situation presently being illustrated, a pulse will be applied to a terminal 27 to charge the capacitor 25 only. The capacitor 25 is charged through a resistor 28, the bus 23, the terminal 22, to the ground 21. Also, a capacitor 29 and a capacitor 39 now are charged from a negative potential which is connected to the terminals 30 and 38.

Now it is necessary to interrupt the conductivity of the holding SCR 19. This is accomplished by switching the terminal 30 to a ground connection 31, thereby discharging the capacitor 29 through a control electrode 32 of a RESET SCR 33. At the same time, a negative voltage is applied to a terminal 34, and therefore, to the cathode 35 of the RESET SCR 33. This negative voltage remains on the terminal 34, and on the cathode 35 for approximately 100 microseconds after the terminal 30 has been connected to the ground 31.

With the positive voltage applied to the control electrode 32, the RESET SCR 33 becomes conductive, thereby connecting the negative potential from the cathode 35 to the anode 36 of the holding SCR 19, rendering the SCR 19 nonconductive, as well as all of the SCR's 13, 14, 15, etc. The terminal 34 is switched to a positive potential to ensure that all of the series-connected SCR's 13, 14, 15, etc., will be rendered nonconductive.

The holding SCR 19 will remain nonconductive until a positive potential is applied to its control electrode 37. When the terminal 38 is switched to ground, a positive potential stored in a capacitor 39 is applied to the control electrode 37, thereby rendering the SCR 19 conductive again. Now, it is necessary to energize the lamp 11.

For the example described above, a voltage has been applied to the capacitor 25, and this will be applied to the control electrode 40 of the series-connected SCR 14. Therefore, when the holding SCR 19 becomes conductive again, only the series-connected SCR 14 will become conductive therewith. Accordingly, only the lamp 11 will become lit to indicate, in this example, that the remotely situated pump is now inoperative.

With the central display system now updated, the ground 21 is removed from the terminal 22 to inhibit the build-up of any charge on any of the capacitors 24, 25, 26, etc., and this ground 21 is not applied again until another updating is desired. Obviously, such updating of the lamps 10, 11, 12, etc., may be done at any time thereafter or may be done repetitively with little time lag. A preferred form of the control circuit is updated approximately every 130 milliseconds. This is done automatically as controlled by external timing circuits not forming a part of this invention. Also, terminals 41 and 42 (similar to the terminal 22) are connected to the same bus 23 to permit the circuit to be "selected" and thus conditioned only by an appropriate "code"; in this instance, it requires all three terminals 22, 41 and 42 to be switched at the same time.

The operation, briefly, is as follows: Assuming that it is desired in a particular updating sequence to extinguish lamp 10 and illuminate lamp 11, lamp 10 being illuminated now, the ground 21 is connected to the terminals 22, 41 and 45 at the same time permitting a voltage applied to the terminal 27 to charge the capacitor 25 and permitting the capacitors 29 and 39 to be charged. This voltage source at the terminal 27 is from some exterior equipment, such as a computer, providing the voltage in response to information concerning the status of a remote situation.

After approximately 600 microseconds, the RESET terminal 30 is connected to ground to apply the charge on the capacitor 29 to the control electrode 32 causing the SCR 33 to fire. A negative voltage of 2 or 3 volts is applied simultaneously to the terminal 34. When the terminal 30 is returned to the ground 31, the terminal 34 remains at a negative voltage for approximately 100 microseconds, and this applies the negative voltage at the terminal 34 to the anode 36 of the holding SCR 19, thereby rendering the SCR 19 nonconductive.

When the holding SCR 19 becomes nonconductive, the series-connected SCR 13 becomes nonconductive because its path to the ground 20 is blocked. Of course, any of the other series-connected SCR's 14, 15, etc., that may have been conductive are rendered nonconductive also.

Next, the negative voltage at the terminal 34 is removed, and the capacitor 39 applies its voltage to the control electrode 37 of the holding SCR 19 by connecting the terminal 38 to ground for about eight microseconds. This renders the SCR 19 conductive, thereby conditioning all of the series-connected SCR's 13, 14, 15, etc., for conductive depending upon the application of a suitable voltage to the respective control electrodes. Since in the present illustration, a voltage is stored in the capacitor 25 only, the control electrode 40 is the only one that receives a "firing" potential. Therefore, the series-connected SCR 14 becomes conductive, and the lamp 11 is lit. This entire sequence of operation requires only approximately one millisecond.

Various modifications and forms of the invention as well as environments for its use will occur to those skilled in the art, and therefore, it is intended that the scope of the invention be limited only by the scope of the appended claims.

I claim:

1. In a central display system, a conduction control circuit comprising:

a plurality of indicating means for indicating a predetermined condition of a plurality of situations, a plurality of silicon controlled rectifiers, one in series with each of said indicating means, a holding silicon controlled rectifier connected to all of said silicon controlled rectifiers for completing an electrical path for energizing said indicating means, means to interrupt the conductivity of said holding silicon controlled rectifier for de-energizing said indicating means and for interrupting the conductivity of said plurality of series-connected silicon controlled rectifiers, separate means for re-establishing the conductivity of said holding silicon controlled rectifier, and trigger means connected with said plurality of silicon controlled rectifiers to energize selected ones of said indicating means.

2. In a central display system, a conduction control circuit as set forth in claim 1 wherein said indicating means includes a plurality of lamps connected to become illuminating by the completion of said electrical path.

3. In a central display system, a conduction control circuit as set forth in claim 1 wherein each of said series-connected silicon controlled rectifiers has a control electrode, and means to connect each control electrode to said trigger means, so that pre-selected ones of said plurality of silicon controlled rectifiers may be rendered conductive.

4. In a central display system, a conduction control circuit as set forth in claim 3 wherein the cathodes of said plurality of silicon controlled rectifiers are all connected to the anode of said holding silicon controlled rectifier.

5. In a central display system, a conduction control circuit as set forth in claim 4 wherein said holding silicon controlled rectifier has a control electrode connected to circuit means for rendering the holding silicon controlled rectifier conductive.

6. In a central display system, a conduction control circuit as set forth in claim 5 including circuit means to connect the cathode of said holding silicon controlled rectifier through a source of electrical energy back to each of said indicating means.

7. In a central display system, a conduction control circuit as set forth in claim 6 wherein said circuit means connected to said control electrode of the holding silicon controlled rectifier includes a capacitor for storing an electrical potential to render the holding silicon controlled rectifier conductive at a predetermined time.

8. In a central display system, a conduction control circuit as set forth in claim 7 wherein said means to interrupt the conductivity of said holding silicon controlled rectifier and control circuit means.

9. In a central display system, a conduction control circuit as set forth in claim 8 wherein said another silicon controlled rectifier includes a control electrode to render said another silicon controlled rectifier conductive.

10. In a central display system, a conduction control circuit as set forth in claim 9 including a capacitor connected to said control electrode to apply a conduction rendering potential to said another silicon controlled rectifier for changing the conductive state of said holding silicon controlled rectifier.

References Cited

UNITED STATES PATENTS

| | | | |
|---|---|---|---|
| 3,147,464 | 9/1964 | Spielman | 340—415 |
| 3,381,286 | 4/1968 | Wash | 340—415 |
| 3,419,857 | 12/1968 | Martin | 340—213.1 |

THOMAS B. HABECKER, Primary Examiner

U.S. Cl. X.R.

340—332